(12) United States Patent  
Hirano et al.

(10) Patent No.: US 11,904,578 B2
(45) Date of Patent: Feb. 20, 2024

(54) STRETCHABLE FILM

(71) Applicant: C.I. TAKIRON Corporation, Osaka (JP)

(72) Inventors: Tatsuya Hirano, Osaka (JP); Takaaki Maeda, Osaka (JP); Akihiro Tanaka, Osaka (JP)

(73) Assignee: C.I. TAKIRON CORPORATION, Osaka (JP)

( * ) Notice: Subject to any disclaimer, the term of this patent is extended or adjusted under 35 U.S.C. 154(b) by 79 days.

(21) Appl. No.: 17/615,806

(22) PCT Filed: Jun. 4, 2020

(86) PCT No.: PCT/JP2020/022079
§ 371 (c)(1),
(2) Date: Dec. 1, 2021

(87) PCT Pub. No.: WO2020/246536
PCT Pub. Date: Dec. 10, 2020

(65) Prior Publication Data
US 2022/0324207 A1    Oct. 13, 2022

(30) Foreign Application Priority Data

Jun. 6, 2019 (JP) .................................. 2019-106404

(51) Int. Cl.
*B32B 27/08* (2006.01)
*B32B 27/20* (2006.01)
*B32B 27/32* (2006.01)

(52) U.S. Cl.
CPC .............. *B32B 27/08* (2013.01); *B32B 27/20* (2013.01); *B32B 27/32* (2013.01);
(Continued)

(58) Field of Classification Search
None
See application file for complete search history.

(56) References Cited

U.S. PATENT DOCUMENTS 6,635,715 B1    10/2003   Datta et al.
2017/0203554 A1   7/2017   Takahashi et al.
(Continued)

FOREIGN PATENT DOCUMENTS

CN    103153618 A    6/2013
CN    103895307 A    7/2014
(Continued)

OTHER PUBLICATIONS

ExxonMobil product datasheet for VistamaxxTM Performace Polymer 6102 (Year: 2020).*
(Continued)

*Primary Examiner* — Ramsey Zacharia
(74) *Attorney, Agent, or Firm* — Seed IP Law Group LLP

(57) ABSTRACT

Provided is a stretchable film including an elastomer layer, and a surface layer provided on any one or both of a first surface and a second surface of the elastomer layer, in which the surface layer contains one or more polypropylene-based resins selected from the group consisting of block polypropylene, which is a copolymer with ethylene, and random polypropylene, which is a copolymer with ethylene, and calcium carbonate, a content of the calcium carbonate in the surface layer is 10% to 75% by mass with respect to a total mass of the surface layer, a thickness of the elastomer layer is 20 μm to 55 μm, and a thickness of the surface layer is 0.4 μm to 5.0 μm.

2 Claims, 1 Drawing Sheet

(52) U.S. Cl.
CPC ....... *B32B 2250/03* (2013.01); *B32B 2250/24* (2013.01); *B32B 2264/104* (2013.01); *B32B 2274/00* (2013.01); *B32B 2307/306* (2013.01); *B32B 2307/308* (2013.01); *B32B 2307/51* (2013.01); *B32B 2307/732* (2013.01)

(56) References Cited

U.S. PATENT DOCUMENTS

| | | | |
|---|---|---|---|
| 2018/0133357 A1 | 5/2018 | Takeda et al. | |
| 2019/0291391 A1 | 9/2019 | Takeda et al. | |
| 2021/0362479 A1* | 11/2021 | Gahleitner | B32B 27/06 |

FOREIGN PATENT DOCUMENTS

| | | |
|---|---|---|
| JP | 2003011298 A | 1/2003 |
| JP | 2013-014127 A | 1/2013 |
| JP | 2013-119583 A | 6/2013 |
| JP | 2016-112878 A | 6/2016 |
| JP | 5948537 B2 | 7/2016 |
| JP | 2018-103439 A | 7/2018 |
| WO | 2016/013577 A1 | 1/2016 |

OTHER PUBLICATIONS

International Search Report, dated Aug. 18, 2020, for International Application No. PCT/JP2020/022079. (4 pages). (with English Translation).

Office Action, dated Jan. 20, 2023, for Chinese Patent Application No. 202080039447.3. (13 pages) (with English Translation).

Extended European Search Report, dated Jun. 5, 2023, for European Application No. 20818231.1-1107. (12 pages).

Chinese Office Action, dated Aug. 8, 2023, for Chinese Patent Application No. 202080039447.3. (17 pages) (with English Translation).

* cited by examiner

STRETCHABLE FILM

TECHNICAL FIELD

The present invention relates to a stretchable film.

Priority is claimed on Japanese Patent Application No. 2019-106404, filed Jun. 6, 2019, the content of which is incorporated herein by reference.

BACKGROUND ART

A stretchable film is used in a wide range of fields, such as sanitary products, sports products, and medical products, to improve handleability, comfort, and the like. For example, the stretchable film is used for clothing, such as underwear, diaper waistbands, a side panel, leg garters, incontinence products, a sanitary napkin, bandages, surgical drapes, tightening bands, hats, swimming pants, sports supporters, and medical supporters.

As the stretchable film, an elastomer, such as a styrene-isoprene-styrene block copolymer or an ethylene copolymer, is used. The stretchable film using the elastomer has a blocking problem. Therefore, in order to suppress the blocking, a stretchable film has been proposed in which a surface layer, such as an olefin layer, is provided on a surface of an elastomer layer. Patent Document 1 discloses a stretchable film in which an olefin layer containing high-density polyethylene (HDPE) or homopolypropylene (H-PP) is provided on a surface of an elastomer layer.

CITATION LIST

Patent Document

[Patent Document 1]
Japanese Unexamined Patent Application, First Publication No. 2016-112878

SUMMARY OF INVENTION

Technical Problem

As in Patent Document 1, the stretchable film using the polyethylene, such as the HDPE, for the surface layer has insufficient heat resistance, so that deformation or a hole is likely to occur in a case of adhering to, for example, a back film or a non-woven fabric using a hot melt adhesive. In addition, it is difficult to obtain sufficient elasticity in the stretchable film using the H-PP for the surface layer. In a case in which the thickness of the elastomer layer is increased, the elasticity is improved, but the rigidity becomes too high. Thus, a strong force is required for stretching.

An object of the present invention is to provide a stretchable film having low rigidity and exceptional blocking resistance, heat resistance, and elasticity.

Solution to Problem

The present invention has the configurations described below.

[1] A stretchable film including an elastomer layer, and a surface layer provided on any one or both of a first surface and a second surface of the elastomer layer, in which the surface layer contains one or more polypropylene-based resins selected from the group consisting of block polypropylene, which is a copolymer with ethylene, and random polypropylene, which is a copolymer with ethylene, and calcium carbonate, a content of the calcium carbonate in the surface layer is 10% to 75% by mass with respect to a total mass of the surface layer, a thickness of the elastomer layer is 20 µm to 55 µm, and a thickness of the surface layer is 0.4 µm to 5.0 µm.

[2] The stretchable film according to [1], in which the surface layer contains 30% to 70% by mass of the polypropylene-based resin and 30% to 70% by mass of the calcium carbonate with respect to the total mass of the surface layer.

[3] The stretchable film according to [1] or [2], in which a melting point of the polypropylene-based resin is lower than 160° C.

Advantageous Effects of Invention

According to the present invention, it is possible to provide a stretchable film having low rigidity and exceptional blocking resistance, heat resistance, and elasticity.

DESCRIPTION OF EMBODIMENTS

The definitions of the following terms are applied throughout the present specification and claims.

A flow direction (MD) is an extrusion direction (longitudinal direction) of a strip-shaped resin film. In addition, a width direction (TD) is a direction perpendicular to the flow direction (MD) along a resin film surface.

A stretchable film according to the present invention includes an elastomer layer and a surface layer provided on any one or both of a first surface and a second surface of the elastomer layer.

Figure 1:
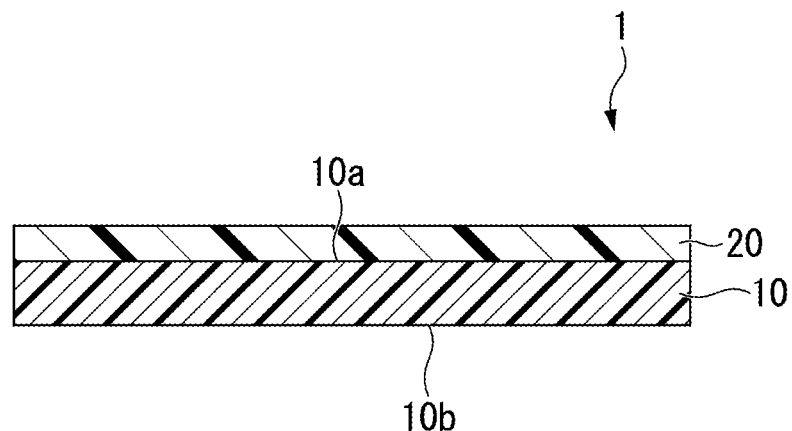
FIG. 1 is a cross-sectional view showing an example of a stretchable film according to the present invention.
Figure 2:
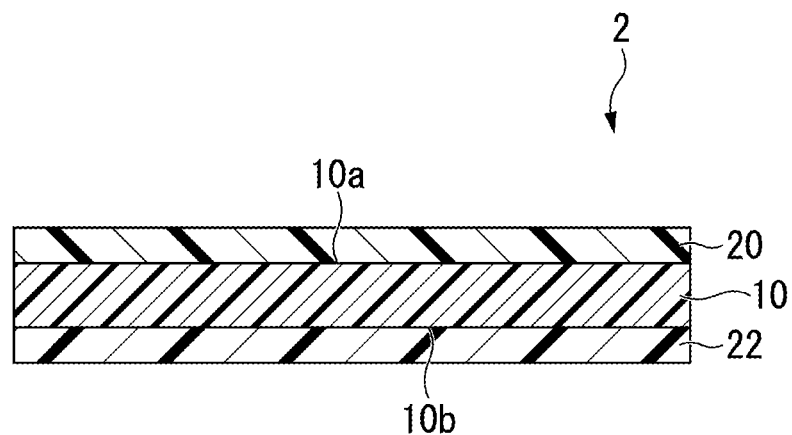
FIG. 2 is a cross-sectional view showing an example of the stretchable film according to the present invention.

Exemplary examples of an embodiment of the stretchable film according to the present invention include stretchable films 1 and 2 shown in FIGS. 1 and 2. As shown in FIG. 1, the stretchable film 1 includes an elastomer layer 10 and a first surface layer 20 provided on a first surface 10a of the elastomer layer 10. As shown in FIG. 2, the stretchable film 2 includes the elastomer layer 10, the first surface layer 20 provided on the first surface 10a of the elastomer layer 10, and a second surface layer 22 provided on a second surface 10b of the elastomer layer 10.

Note that the dimensions and the like in FIGS. 1 and 2 are examples, and the present invention is not always limited thereto, and can be appropriately modified and implemented within the scope of the present invention as defined in the claims.

The elastomer layer is a layer which contains an elastomer.

The elastomer refers to a polymer having rubber elasticity at equal to or higher than a glass transition temperature. Therefore, the elastomer generally has a glass transition temperature equal to or lower than room temperature (23° C.). Specific exemplary examples of the elastomer include a styrene-based elastomer, an olefin-based elastomer, a urethane-based elastomer, and a polyester-based elastomer. Among these, the olefin-based elastomer is preferable from the viewpoints of the strength and the restorability. In addition, the styrene-based elastomer is preferable from the viewpoint of high dimensional stability during film transport. The elastomer contained in the elastomer layer may be one type or two types or more.

Exemplary examples of the styrene-based elastomer include a styrene-isoprene-styrene copolymer (SIS elastomer), a styrene-isoprene block copolymer, a styrene-butadiene-styrene block copolymer, a styrene-butadiene block copolymer, a hydrogenated product of a styrene-isoprene-styrene block copolymer (styrene-ethylene-propylene-styrene block copolymer), and a hydrogenated product of a styrene-butadiene-styrene block copolymer (styrene-ethylene-butylene-styrene block copolymer). Among these, the SIS elastomer is preferable from the viewpoints of high strength and restorability.

A styrene unit content of the SIS elastomer is preferably 14% to 48% by mass. In a case in which the styrene unit content of the SIS elastomer is equal to or more than the lower limit value described above, the formability is improved. In a case in which the styrene unit content of the SIS elastomer is equal to or less than the upper limit value described above, a sufficiently high elasticity can be obtained.

A commercially available product can be used as the SIS elastomer.

Exemplary examples of the commercially available product of the SIS elastomer include Quintac 3390 (SIS block copolymer, glass transition temperature: −53° C., styrene unit content: 48% by mass, manufactured by ZEON CORPORATION) and Quintac 3620 (SIS block copolymer, glass transition temperature: −50° C., styrene unit content: 14% by mass, manufactured by ZEON CORPORATION).

Exemplary examples of the olefin-based elastomer include a copolymer or a homopolymer containing olefin having 3 or more carbon atoms as a main component, and a copolymer with olefin having 3 or more carbon atoms containing ethylene as a main component. Specific exemplary examples thereof include an α-olefin homopolymer, such as a propylene homopolymer or a 1-butene homopolymer having low stereoregularity; an α-olefin copolymer, such as a propylene-ethylene copolymer, a propylene-ethylene-1-butene copolymer, a 1-butene-ethylene copolymer, a 1-butene-propylene copolymer, a 4-methylpentene-1-propylene copolymer, a 4-methylpentene-1-1-butene copolymer, a 4-methylpentene-1-propylene-1-butene copolymer, a propylene-1-butene copolymer, an ethylene-propylene copolymer, an ethylene-hexene copolymer, and an ethylene-1-octene copolymer; and an ethylene-α-olefin-diene ternary copolymer, such as an ethylene-propylene-ethylidene norbornene copolymer, an ethylene-propylene-butadiene copolymer, and an ethylene-propylene-isoprene copolymer. In addition, an elastomer in which the elastomers described above are dispersed in a matrix of crystalline polyolefin may be adopted. One type of olefin-based elastomer may be used alone, or two types or more thereof may be used in combination.

As the olefin-based elastomer, a propylene-based elastomer (propylene-ethylene copolymer and the like, hereinafter also referred to as "PP-based elastomer"), which is a copolymer or a homopolymer containing propylene as the main component and an ethylene-octene elastomer (ethylene-octene copolymer and the like), which is a copolymer or a homopolymer containing ethylene as the main component are preferable from the viewpoint of the strength and the restorability.

A propylene unit content is preferably 70% to 95% by mass, and more preferably 80% to 90% by mass with respect to all the units of the PP-based elastomer. In a case in which the propylene content of the PP-based elastomer is equal to or more than the lower limit value, the formability is improved. In a case in which the propylene content of the PP-based elastomer is equal to or less than the upper limit value, high elasticity can be easily obtained.

A commercially available product can be used as the olefin-based elastomer.

Exemplary examples of the commercially available product of the olefin-based elastomer include a trade name "VISTAMAXX 6102" (propylene-ethylene copolymer, ethylene unit content: 16% by mass, manufactured by Exxon Mobil Corporation) and a trade name "Infuse 9007" (ethylene-octene copolymer, manufactured by The Dow Chemical Company) and the like.

As the elastomer, one selected from the group consisting of the PP-based elastomer and the ethylene-octene elastomer is preferable from the viewpoints of the strength and the restorability. However, two types or more of the elastomers may be mixed and used.

In addition, as the elastomer, the styrene-based elastomer is preferable from the viewpoint of high dimensional stability during film transport. However, two types or more of the styrene-based elastomers may be mixed and used.

The elastomer layer may contain components other than a thermoplastic elastomer as long as the effects of the present invention are not impaired. Exemplary examples of the other component include additives, such as a weather stabilizer, an antistatic agent, an antifog agent, metal soap, wax, an antifungal agent, an antibacterial agent, a nucleating agent, a flame retardant, a UV absorber, a light stabilizer, an oxidation inhibitor, an antitarnish agent, a pigment, a dye, and a filler.

A thickness of the elastomer layer is 20 μm to 55 μm, preferably 25 μm to 53 μm, and more preferably 30 μm to 50 μm. In a case in which the thickness of the elastomer layer is equal to or more than the lower limit value of the range described above, the elasticity is exceptional. In a case in which the thickness of the elastomer layer is equal to or less than the upper limit value of the range described above, the rigidity is decreased.

The elastomer layer may be a single layer or a multi-layer. In a case in which the elastomer layer is the multi-layer, a total thickness of the elastomer layers is within the range described above.

In addition, in a case in which the elastomer layer is the multi-layer, the components of the different elastomer layers may be the same as or different from each other.

The surface layer is a layer containing one or more polypropylene-based resins (hereinafter also referred to as "polypropylene-based resin (B)") selected from the group consisting of block polypropylene (hereinafter also referred to as "B-PP"), which is a copolymer with ethylene, and random polypropylene (hereinafter also referred to as "R-PP"), which is a copolymer with ethylene, and calcium carbonate. Excellent blocking resistance can be obtained by providing the surface layer on the surface of the elastomer layer.

The polypropylene-based resin (B) contained in the surface layer may be of one type or two types or more.

In a case in which a first surface layer and a second surface layer are provided on both surfaces of the elastomer layer, the polypropylene-based resin (B) contained in the first surface layer and the polypropylene-based resin (B) contained in the second surface layer may be the same as or different from each other.

The H-PP is a homopolymer of propylene and has a high crystallinity due to high tacticity. Therefore, a film using the H-PP tends to have high rigidity and lack flexibility. On the other hand, since the R-PP is obtained by copolymerizing ethylene with propylene, the tacticity is decreased and the crystallinity is decreased as compared with those of the H-PP, so that the R-PP is exceptional in the flexibility and has heat resistance. The B-PP forms a sea-island structure composed of a polypropylene sea portion and an ethylene island portion and forms an EPR phase at a boundary portion of the sea-island while maintaining the heat resistance equivalent to that of the H-PP, so that the B-PP has the flexibility.

The melting point of the polypropylene-based resin (B) is preferably lower than 160° C., and more preferably equal to or higher than 135° C. and lower than 160° C. In a case in which the melting point of the polypropylene-based resin (B) is lower than 160° C., the polypropylene-based resin (B) contains the necessary ethylene resin, and the flexibility of the polypropylene-based resin (B) is exceptional. Thus, the elasticity of the stretchable film is exceptional. In a case in which the melting point of the polypropylene-based resin (B) is equal to or higher than 135° C., the polypropylene-based resin (B) contains the necessary propylene resin, and thus the heat resistance is exceptional.

Note that the melting point is a peak temperature measured by a differential scanning calorimetry (DSC) method.

The content of the polypropylene-based resin (B) in the surface layer is preferably 25% to 90% by mass, more preferably 27% to 80% by mass, and still more preferably 30% to 70% by mass with respect to a total mass of the surface layer. In a case in which the content of the polypropylene-based resin (B) is equal to or more than the lower limit value of the range described above, the heat resistance is exceptional. In a case in which the content of the polypropylene-based resin (B) is equal to or less than the upper limit value of the range described above, the rigidity is decreased and the elasticity is exceptional.

The content of the calcium carbonate in the surface layer is 10% to 75% by mass, preferably 20% to 73% by mass, and more preferably 30% to 70% by mass with respect to the total mass of the surface layer. In a case in which the content of the calcium carbonate is equal to or more than the lower limit value of the range described above, the rigidity is decreased and the elasticity is exceptional. In a case in which the content of the calcium carbonate is equal to or less than the upper limit value of the range described above, the manufacture of the stretchable film is stable.

The surface layer may contain components other than the polypropylene-based resin (B) and the calcium carbonate as long as the effects of the present invention are not impaired. Exemplary examples of the other component include the additives described in the elastomer layer. In addition, an inorganic filler other than the calcium carbonate, such as zeolite and silica, may be contained. A resin other than the polypropylene-based resin (B), such as the homopolypropylene (H-PP) and polyethylene (PE), may be contained.

The thickness of the surface layer is 0.4 μm to 5.0 μm, preferably 0.5 μm to 4.5 μm, and more preferably 1 μm to 4.0 μm. In a case in which the thickness of the surface layer is equal to or more than the lower limit value of the range described above, the manufacture of the stretchable film is more stable. In a case in which the thickness of the surface layer is equal to or less than the upper limit value of the range described above, the stretchable film can be thinned. Particularly, the surface layer formed of the polypropylene-based resin (B), which has higher rigidity than the elastomer, is thinned, so that the influence of the rigidity of the surface layer to the stretchable film is reduced. Therefore, the rigidity of the stretchable film is decreased, and the elasticity is exceptional.

In a case in which the first surface layer and the second surface layer are provided on both surfaces of the elastomer layer, both the thickness of the first surface layer and the thickness of the second surface layer are within the range described above.

Note that the thickness of the first surface layer and the thickness of the second surface layer may be the same as or different from each other.

A total thickness of the stretchable film is preferably 20 μm to 60 μm, more preferably 25 μm to 55 μm, and still more preferably 30 μm to 50 μm. In a case in which the total thickness of the stretchable film is equal to or more than the lower limit value of the range described above, the elasticity is exceptional. In a case in which the total thickness of the stretchable film is equal to or less than the upper limit value of the range described above, the stretchable film can be thinned, the rigidity is decreased, and the elasticity is exceptional.

The manufacturing method of the stretchable film is not particularly limited, and exemplary examples thereof include an inflation method and a cast film process method. Among these, the cast film process method is preferable from the viewpoint of productivity.

The use of the stretchable film according to the present invention is not particularly limited and can be used for a sanitary product, a sports product, a medical product, and the like. For example, the stretchable film can be used for clothing, such as underwear, diaper waistbands, a side panel, leg garters, incontinence products, a sanitary napkin, bandages, surgical drapes, tightening bands, hats, swimming pants, sports supporters, and medical supporters.

As described above, in the stretchable film according to the present invention, the surface layer including the polypropylene-based resin (B) and the calcium carbonate of the specific ratio is provided any one or both the first surface and the second surface of the elastomer layer, and the thicknesses of the elastomer layer and the surface layer are controlled within the specific range. By providing such a surface layer, excellent blocking resistance can be obtained, the rigidity is decreased, and exceptional heat resistance and elasticity can also be obtained.

EXAMPLES

In the following, the present invention will be specifically described with reference to Examples, but the present invention is not limited to the description below.

[Measurement Method and Evaluation Method]

(Thickness of Each Layer)

The thicknesses of the elastomer layer and the surface layer of the stretchable film were obtained by observing a cross section thereof with a microscope.

(Heat Resistance)

A hot melt at 135° C. was applied to the stretchable film and left for 1 minute, then a shape of the film was visually observed, and the heat resistance was evaluated in accordance with the following criteria.

◯ (good): Deformation of the film or breakage of the film was not observed, and the heat resistance was excellent.

x (poor): Deformation of the film or breakage of the film was observed, and the heat resistance was insufficient.

(Permanent Strain of Stretchable Film)

A strip-shaped test piece of 100 mm in a stretching direction of the film and 25 mm in a direction perpendicular to the stretching direction was cut out from the stretchable film. The test piece was fixed to a gripper of a precision universal testing machine (manufactured by Shimadzu Corporation, autograph, material test operation software: TRAPEZIUM 2) such the distance between the grippers was 25 mm. The test piece was stretched in the longitudinal direction at a speed of 254 mm/min such that the elongation calculated by the following expression (I) was 100%, and then the test piece was immediately contracted at the same speed. The permanent strain was calculated from the following expression (II). The test was performed at 23° C.±2° C.

$$\text{Elongation}=(L1-L0)/L0\times100 \qquad (I)$$

$$\text{Permanent strain}=(L2-L0)/L0\times100 \qquad (II)$$

Note that L0 is the distance (mm) between the grippers before stretch. L1 is the distance (mm) between the grippers after stretch. L2 is the distance (mm) between the grippers in a case in which a load (N/25 mm) of the test piece is 0 when the test piece is contracted.

The stretching direction of the film is MD in a case in which the olefin-based elastomer is used, and TD in a case in which the styrene-based elastomer is used.

(Rigidity)

The rigidity of the stretchable film was evaluated from a stress-strain curve (S-S curve) measured in a permanent strain test in accordance with the following criteria.

◯ (good): The test force at a point in time when the elongation at the time of stretch is 50% is equal to or less than 4N.

x (poor): The test force at a point in time when the elongation at the time of stretch is 50% exceeds 4N.

(Elasticity)

The elasticity of the stretchable film was evaluated from the stress-strain curve (S-S curve) measured in a permanent strain test in accordance with the following criteria.

◯ (good): The permanent strain is equal to or less than 20%.

x (poor): The permanent strain exceeds 20%.

[Raw Material]

The raw materials used in Examples are shown below.

(Elastomer)

Elastomer (A-1): ethylene-octene elastomer (Infuse 9007, manufactured by The Dow Chemical Company)

Elastomer (A-2): PP-based elastomer (Vistamaxx 6102FL, manufactured by Exxon Mobil Corporation)

Elastomer (A-3): SIS elastomer (Quintac 3390, 48% by mass of styrene content, manufactured by ZEON CORPORATION)

Elastomer (A-4): SIS elastomer (Quintac 3620, 14% by mass of styrene content, manufactured by ZEON CORPORATION)

(Polypropylene-Based Resin (B))

Resin (B-1): R-PP (F227, 152° C. of melting point, manufactured by Prime Polymer Co., Ltd.) Resin (B-2): B-PP (WAYMAX MFX3, 157° C. of melting point, manufactured by Japan Polypropylene Corporation)

(Inorganic Filler)

Calcium carbonate (LIGHTON S, manufactured by BIHOKU FUNKA KOGYO CO., LTD.)

(Comparison Target Resin)

Resin (X-1): homopolypropylene (H-PP, NOBLEN D101, 163° C. of melting point, manufactured by SUMITOMO CHEMICAL COMPANY, LIMITED)

Resin (X-2): Polyethylene (PE, SUMIKATHENE CE3506, 117° C. of melting point, manufactured by SUMITOMO CHEMICAL COMPANY, LIMITED)

Examples 1 to 8 and Comparative Examples 1 to 7

Each component forming the surface layer was mixed with a tumbler mixer in the formulations shown in Tables 1 and 2 to obtain a resin mixture. Next, the stretchable film having the elastomer layer and the first surface layer and the second surface layer formed of the resin mixture on both surfaces of the elastomer layer was manufactured by the cast film process method.

TABLE 1

| | | EXAMPLE | | | | | | | |
|---|---|---|---|---|---|---|---|---|---|
| | | 1 | 2 | 3 | 4 | 5 | 6 | 7 | 8 |
| SURFACE LAYER [% BY MASS] | CALCIUM CARBONATE | 35.0 | 70.0 | 49.0 | 35.0 | 10.5 | 35.0 | 35.0 | 35.0 |
| | RESIN (B-1) | 65.0 | 30.0 | 51.0 | 65.0 | 89.5 | 65.0 | — | 65.0 |
| | RESIN (B-2) | — | — | — | — | — | — | 65.0 | — |
| | RESIN (X-1) | — | — | — | — | — | — | — | — |
| | RESIN (X-2) | — | — | — | — | — | — | — | — |
| FIRST ELASTOMER LAYER [% BY MASS] SECOND AND THIRD ELASTOMER LAYERS [% BY MASS] | ELASTOMER (A-1) | 100.0 | 100.0 | — | — | — | — | 100.0 | — |
| | ELASTOMER (A-2) | — | — | 100.0 | — | — | — | — | — |
| | ELASTOMER (A-3) | — | — | — | 100.0 | 100.0 | 100.0 | — | 100.0 |
| | ELASTOMER (A-4) | — | — | — | — | — | — | — | 100.0 |
| THICKNESS [μm] | FIRST SURFACE LAYER | 4.0 | 2.0 | 2.0 | 2.0 | 1.0 | 2.0 | 2.0 | 2.0 |
| | SECOND ELASTOMER LAYER | — | — | — | — | — | — | — | 10.0 |
| | FIRST ELASTOMER LAYER | 36.0 | 36.0 | 40.0 | 30.0 | 40.0 | 40.0 | 36.0 | 20.0 |
| | THIRD ELASTOMER LAYER | — | — | — | — | — | — | — | 10.0 |
| | SECOND SURFACE LAYER | 4.0 | 2.0 | 2.0 | 2.0 | 1.0 | 2.0 | 2.0 | 2.0 |
| | TOTAL | 44.0 | 40.0 | 44.0 | 34.0 | 42.0 | 44.0 | 40.0 | 44.0 |
| EVALUATION | HEAT RESISTANCE | ◯ | ◯ | ◯ | ◯ | ◯ | ◯ | ◯ | ◯ |
| | RIGIDITY | ◯ | ◯ | ◯ | ◯ | ◯ | ◯ | ◯ | ◯ |
| | ELASTICITY | ◯ | ◯ | ◯ | ◯ | ◯ | ◯ | ◯ | ◯ |

TABLE 2

|  |  | COMPARATIVE EXAMPLE | | | | | | |
|---|---|---|---|---|---|---|---|---|
|  |  | 1 | 2 | 3 | 4 | 5 | 6 | 7 |
| SURFACE LAYER [% BY MASS] | CALCIUM CARBONATE | 35.0 | 15.0 | — | 50.0 | 50.0 | 50.0 | 80.0 |
|  | RESIN (B-1) | — | — | 100.0 | 50.0 | 50.0 | 50.0 | 20.0 |
|  | RESIN (B-2) | — | — | — | — | — | — | — |
|  | RESIN (X-1) | 65.0 | — | — | — | — | — | — |
|  | RESIN (X-2) | — | 85.0 | — | — | — | — | — |
| FIRST ELASTOMER LAYER [% BY MASS] SECOND AND THIRD ELASTOMER LAYERS [% BY MASS] | ELASTOMER (A-1) | 100.0 | — | 100.0 | 100.0 | 100.0 | 100.0 | 100.0 |
|  | ELASTOMER (A-2) | — | 100.0 | — | — | — | — | — |
|  | ELASTOMER (A-3) | — | — | — | — | — | — | — |
|  | ELASTOMER (A-4) | — | — | — | — | — | — | — |
| THICKNESS [μm] | FIRST SURFACE LAYER | 2.0 | 4.0 | 2.0 | 2.0 | 4.0 | 6.0 | 2.0 |
|  | SECOND ELASTOMER LAYER | — | — | — | — | — | — | — |
|  | FIRST ELASTOMER LAYER | 36.0 | 38.0 | 36.0 | 15.0 | 60.0 | 38.0 | 36.0 |
|  | THIRD ELASTOMER LAYER | — | — | — | — | — | — | — |
|  | SECOND SURFACE LAYER | 2.0 | 4.0 | 2.0 | 2.0 | 4.0 | 6.0 | 2.0 |
|  | TOTAL | 40.0 | 46.0 | 40.0 | 19.0 | 68.0 | 50.0 | 40.0 |
| EVALUATION | HEAT RESISTANCE | ○ | x | ○ | ○ | ○ | ○ | MANUFACTURE IS NOT POSSIBLE |
|  | RIGIDITY | x | ○ | ○ | ○ | x | x |  |
|  | ELASTICITY | ○ | ○ | x | x | x | x |  |

As shown in Table 1, the stretchable films of Examples 1 to 8 each including the surface layer containing the polypropylene-based resin (B) and containing the calcium carbonate in the specific ratio had low rigidity and were exceptional in heat resistance and elasticity.

On the other hand, the film of Comparative Example 1 in which the H-PP was used instead of the polypropylene-based resin (B) had high rigidity. The film of Comparative Example 2 in which the PE was used instead of the polypropylene-based resin (B) for the surface layer had insufficient heat resistance. The film of Comparative Example 3 in which the surface layer did not contain the calcium carbonate and the film of Comparative Example 4 in which the elastomer layer was too thin had insufficient elasticity. The film of Comparative Example 5 in which the elastomer layer was too thick and the film of Comparative Example 6 in which the surface layer was too thick had high rigidity and insufficient elasticity. In Comparative Example 7 in which the content of the calcium carbonate in the resin mixture that forms the surface layer was too large, the film could not be manufactured.

INDUSTRIAL APPLICABILITY

According to the present invention, it is possible to provide a stretchable film having low rigidity and exceptional blocking resistance, heat resistance, and elasticity.

REFERENCE SIGNS LIST 1, 2: Stretchable film
10: Elastomer layer
10a: First surface
10b: Second surface
20: First surface layer
22: Second surface layer

The invention claimed is:
1. A stretchable film comprising:
an elastomer layer; and
a surface layer provided on any one or both of a first surface and a second surface of the elastomer layer,
wherein the surface layer contains one or more polypropylene-based resins selected from the group consisting of block polypropylene, which is a copolymer with ethylene, and random polypropylene, which is a copolymer with ethylene, and calcium carbonate,
a content of the calcium carbonate in the surface layer is 10% to 75% by mass with respect to a total mass of the surface layer,
a thickness of the elastomer layer is 20 μm to 55 μm,
a thickness of the surface layer is 0.4 μm to 5.0 μm, and
a melting point of the polypropylene-based resin is equal to or higher than 135° C. and lower than 160° C.
2. The stretchable film according to claim 1,
wherein the surface layer contains 30% to 70% by mass of the polypropylene-based resin and 30% to 70% by mass of the calcium carbonate with respect to the total mass of the surface layer.

\* \* \* \* \*